April 29, 1930.  C. L. GOUGHNOUR  1,756,787
STEAM COOKER
Filed May 26, 1927    4 Sheets-Sheet 1

INVENTOR.
Charles L. Goughnour.
BY
Bryant & Lowry
ATTORNEYS.

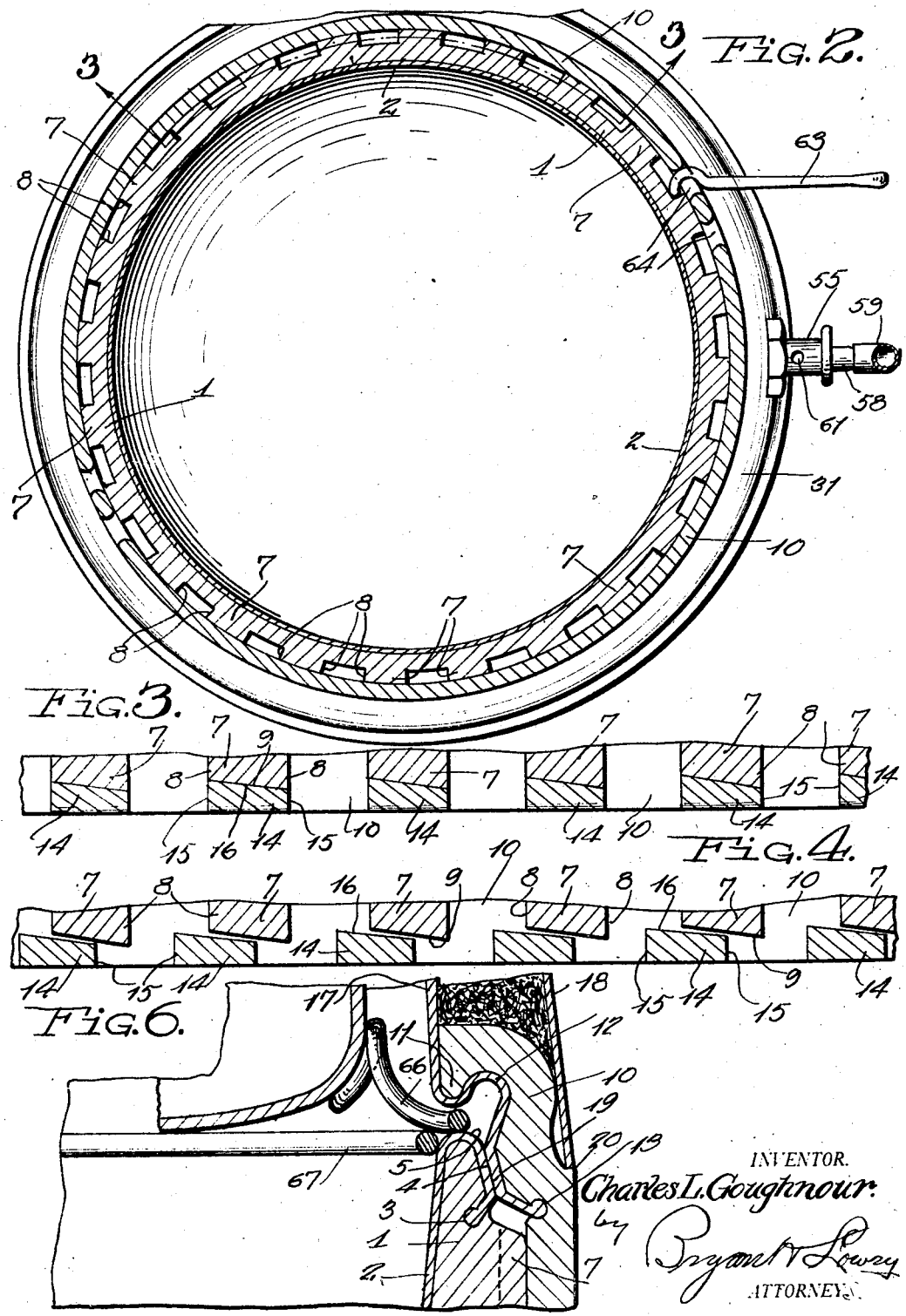

April 29, 1930. C. L. GOUGHNOUR 1,756,787
STEAM COOKER
Filed May 26, 1927 4 Sheets-Sheet 3
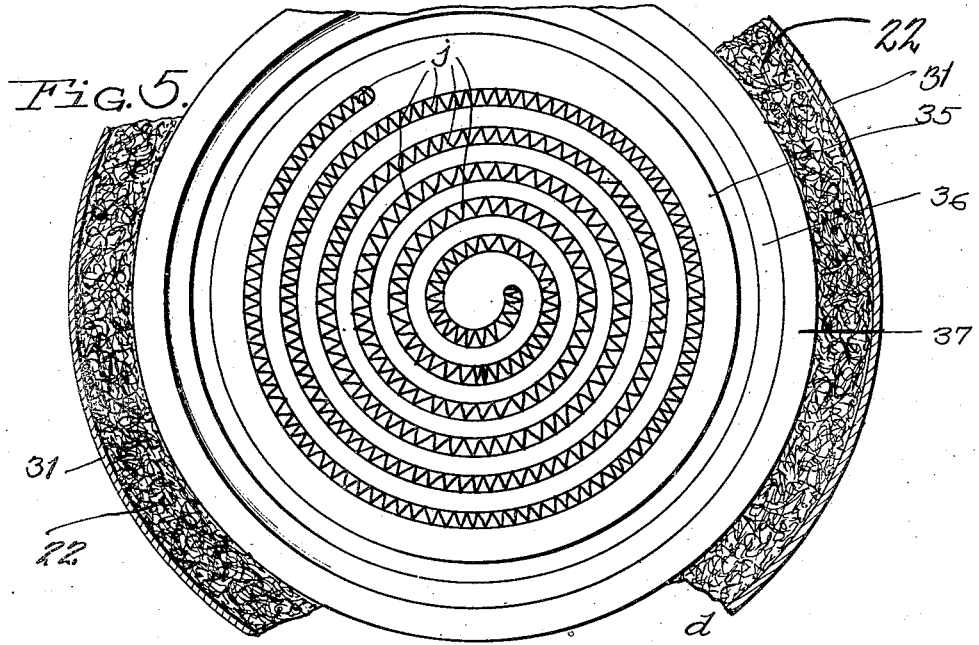
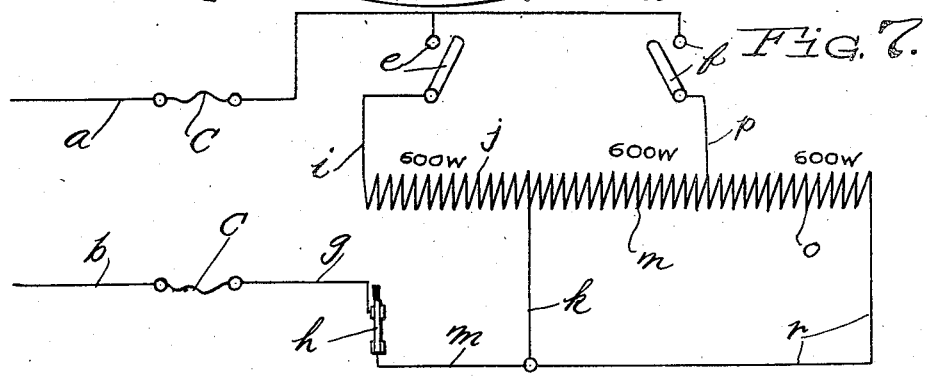
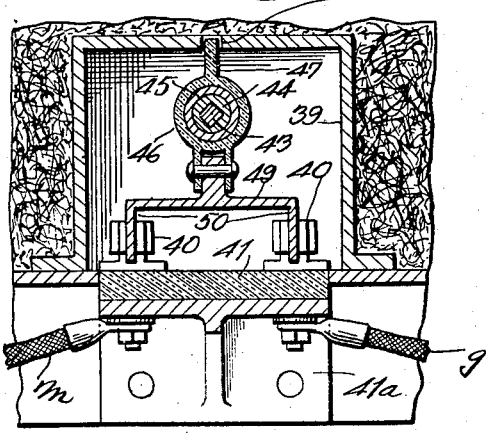
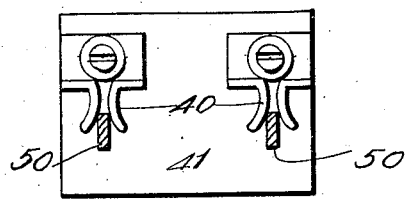
INVENTOR.
Charles L. Goughnour.
BY
ATTORNEYS.

April 29, 1930.  C. L. GOUGHNOUR  1,756,787
STEAM COOKER
Filed May 26, 1927   4 Sheets-Sheet 4
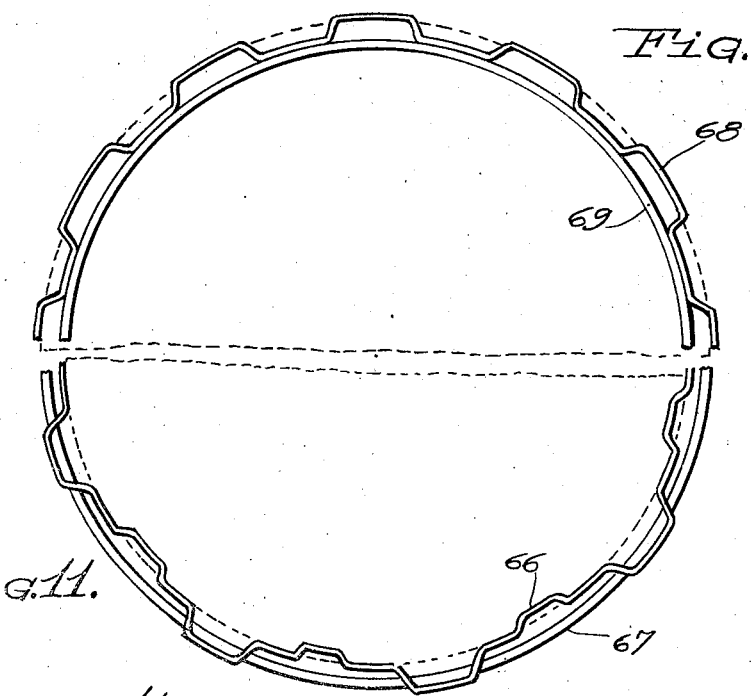
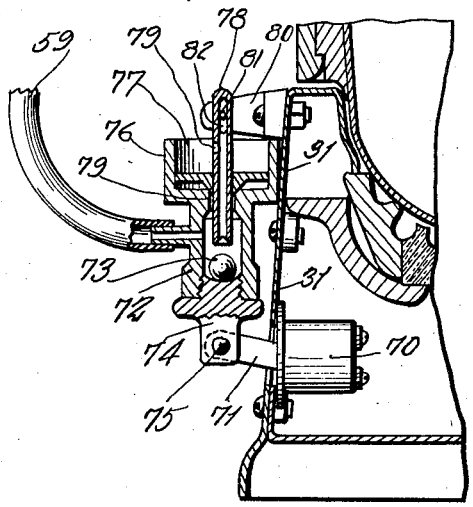
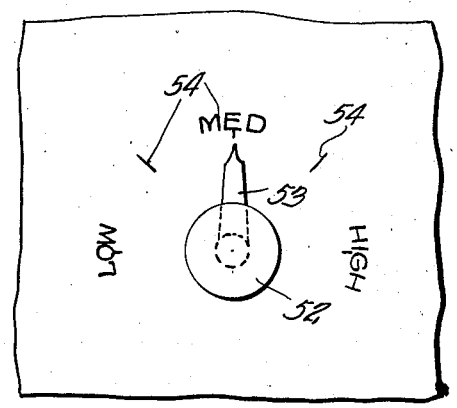
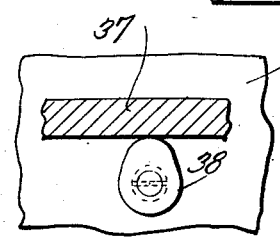
INVENTOR.
Charles L. Goughnour.
BY
ATTORNEYS Patented Apr. 29, 1930

1,756,787

UNITED STATES PATENT OFFICE

CHARLES L. GOUGHNOUR, OF JEFFERSON CITY, TENNESSEE

STEAM COOKER

Application filed May 26, 1927. Serial No. 194,372.

This invention relates to certain new and useful improvements in steam cookers.

It has heretofore been customary, in steam cookers of the general type disclosed in this application, to construct such cookers of cast metal, such as aluminum or the like, and one of the primary and important objects of this invention is to construct a steam cooker of sheet metal with sheet metal contacts or joints between the two sections of the steam cooker body that are assembled in a manner to provide a steam tight joint for the purpose of eliminating all machining or finishing of the contact faces of the joints as has heretofore been required in steam cookers formed of cast metal, thereby greatly reducing the cost of manufacture and providing a cooker that is more efficient in its operation.

A further object of the invention is to provide a steam cooker formed of three major sections, the base section having the heating medium associated therewith while the two upper sections that are interlockingly engaged with each other to form the steam cooking chamber are removably supported upon the base section.

Another object of the invention is to provide in a steam cooker of the type above described, a wedging interlocking connection between the two upper sections of the cooker to insure a steam tight joint between the contacting sheet metal faces, the two upper sections being assembled or dis-assembled by relatively reverse rotary movement.

Another object of the invention is to provide a steam pressure cooker with a valve device that is automatic in its operation to permit all air to be exhausted from the cooker during initial heating thereof with the subsequent escape of steam and condensation thereof operating to close the valve with the food cooked by super-heated dry steam in the presence of the desired temperature.

A still further object of the invention is to utilize the steam pressure confined within the cooker for the automatic cut off of the heating medium, adjustable devices being associated with the cooker that are adapted to be initially set to cause the heating medium to be cut off when a predetermined temperature within the cooker has been attained, the automatic cut-off device being of a nature to permit its association with the heating medium of the gaseous, fluid, or electrical type.

With the above and other objects in view that will become apparent as the nature of the invention is better understood, the same consists in the novel form, combination and arrangement of parts hereinafter more fully described, shown in the accompanying drawings and claimed.

In the accompanying drawings, wherein like reference characters are employed to indicate corresponding parts throughout the several views.

Figure 1 is a vertical sectional view of a steam cooker constructed in accordance with the present invention, the same being illustrated as constructed of sheet metal with abutting contact faces of sheet metal forming the joint between the two sections of the cooking chamber, the heating medium carried by the base section being an electric resistance element and further showing the steam pipe connection between the head of the cooker and the automatic valve that closes the cooking chamber to the atmosphere after the escape of all air from the cooking chamber;

Figure 2 is a horizontal sectional view taken on line 2—2 of Figure 1 showing the implement in position for rotating the inter-engaged parts of the cooking chamber to affect a wedging interlocking connection;

Figure 3 is a fragmentary sectional view taken on line 3—3 of Figure 2 showing the engaged wedge lug on the meeting edges of the upper and lower sections of the cooking chamber;

Figure 4 is a detail sectional view similar to Figure 3 showing the lugs laterally displaced;

Figure 5 is a horizontal sectional view taken on line 5—5 of Figure 1 showing the heating grid;

Figure 6 is an enlarged detail sectional view of the joint between the edges of the two upper cooker sections showing the metal rings with which the sheet metal walls of the cooker are engaged and also a part of a pan rack;

Figure 7 is a diagrammatic view of the wiring arrangement showing two manual operable switches for selectively cutting-in the desired resistance and also the automatically operated switch for cutting out all resistance when a predetermined temperature has been attained;

Figure 8 is a detailed sectional view taken on line 8—8 of Figure 1 showing the adjusting device for the switch to cause the same to be automatically operated at different temperatures for cutting off the supply of heating medium;

Figure 9 is a detail sectional view taken on line 9—9 of Figure 1;

Figures 10 and 11 are fragmentary top plan views of the upper and lower pan supporting racks;

Figure 12 is a detail sectional view of another type of automatic valve for closing the steam cooking chamber to the atmosphere after all air has been exhausted;

Figure 13 is a fragmentary side elevational view of a part of the cooker base showing the indicator for the valve adjusting means; and Figure 14 is a detail sectional view taken on line 14—14 of Figure 1.

Figure 1:
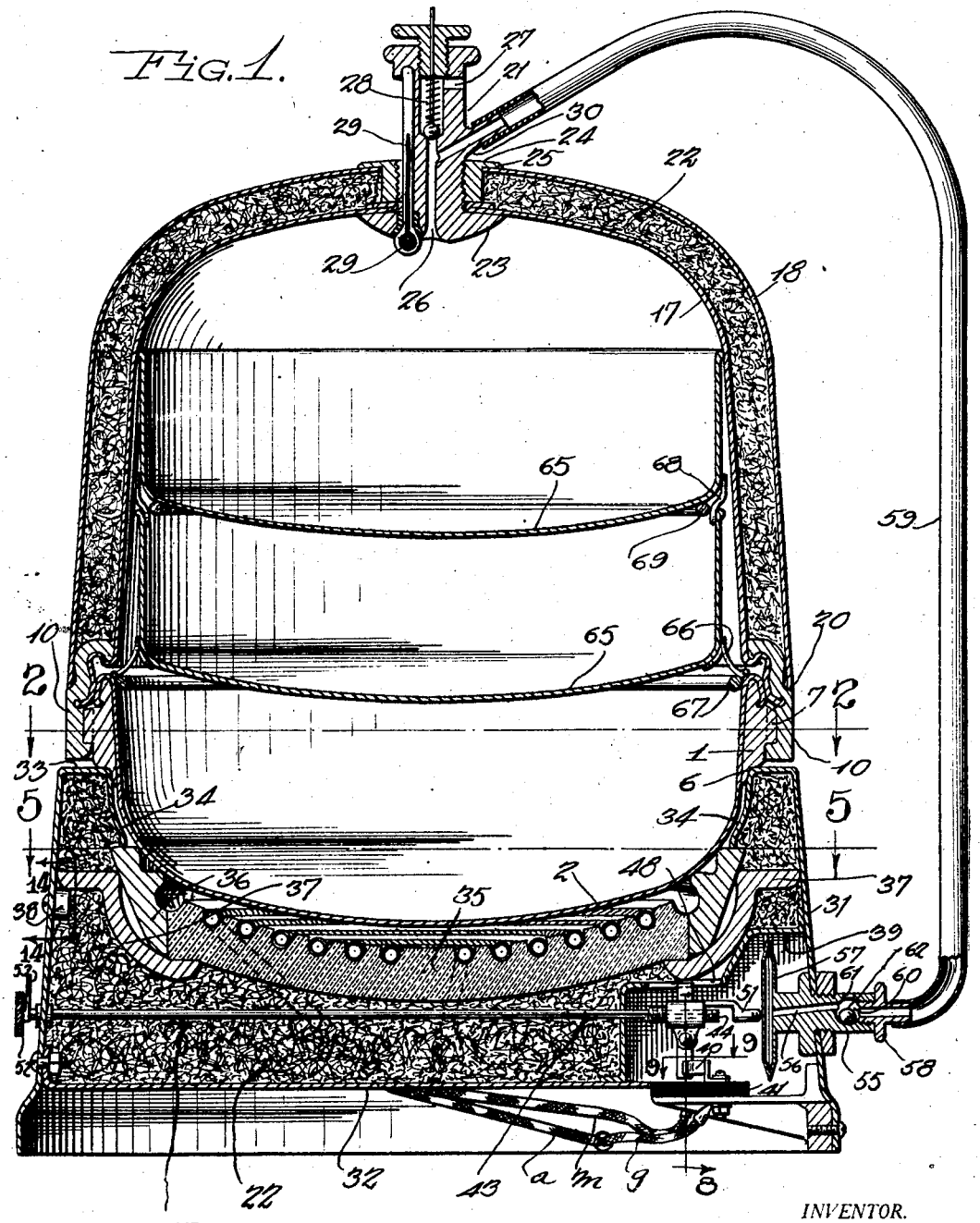

The steam cooker disclosed herein comprises three main sections, one of the sections to be hereinafter referred to as a base with the other two sections forming the cooking chamber that may be separately or unitarily mounted upon and removed from the base. The heating medium is associated with the base section, and as an illustration of such heating medium, there is disclosed an electric resistance element. Manually operable switches for controlling the resistance are carried by the base section and a single automatic switch is in the resistance circuit for cutting out the source of energy at predetermined temperatures. A wedging interlocking connection is formed between the two sections of the cooking chamber to effect a steamtight joint. The walls of the cooking chamber are formed of sheet metal with a cast ring at the edges of the sheet metal sections that are interlockingly engaged, the sheet metal edges of the two sections of the cooking chamber abutting when the sections are assembled and forming a steam tight joint. The lower section of the cooking chamber is of single wall formation while the upper section thereof is of double wall formation having a non-conductor of heat packing embedded therein, such as asbestos or the like. A plug is carried by the upper section of the cooking chamber at the top wall thereof and supports a thermometer for determining temperatures during cooking operations, a safety valve and a steam hose connection with a valve carried by the base section that is associated with the automatic switch. The valve is constructed in a manner to permit the escape to atmosphere of air within the cooker and to be automatically closed when all air has escaped and after steam has condensed therein so that the cooking operation is accomplished in the presence of superheated steam.

Referring more in detail to the accompanying drawings, there is illustrated a steam cooker comprising a base heating section and an upper cooking chamber, the detail construction of the cooking chamber being shown more clearly in Figures 1 to 4 and 6. The cooking chamber is formed of two sections, the lower section comprising a ring 1 of cast metal or the like that is of cross sectional configuration as shown in Figure 1 and to which ring a sheet metal bowl 2 is permanently secured. The sheet metal bowl is enclosed by the ring 1 and the upper edge of the bowl is rolled over the ring with the free edge thereof forced into the annular groove 3 at the outer side of the ring under pressure for holding the parts rigidly assembled. The exposed sheet metal face 4 at the outer side of the ring adjacent the upper end is arranged at an inclination as shown from the upper edge 5 thereof. The lower outer edge of the ring 1 is annularly grooved as at 6 to accommodate mounting of the ring upon the base section in a manner to be hereinafter described while the outer side of the ring 1 between the upper and lower edges thereof is formed with a plurality of outwardly extending lugs 7 having parallel end walls 8 and an inclined bottom wall 9, the lugs being equidistantly spaced apart.

The upper section of the cooking chamber comprises a metal ring 10 of the form best illustrated in Figures 1 and 6 having a depending ridge 11 on the inner face thereof adjacent its upper end defining an undercut annular pocket 12 and further having an annular groove 13 substantially at the median line of the inner side. A plurality of inwardly projecting lugs 14 are provided on the inner face of the ring 10 at its lower edge having parallel end walls 15 and an inclined upper wall 16, the inclined walls or faces 9 and 16 of the lugs 7 and 14 extending in opposite directions so that when the two rings of the cooking chamber sections are assembled, wedging engagement is accomplished as shown in Figures 3 and 4, the spaces between the several lugs 7 and 14 permitting assembly of the two rings.

The upper section of the cooking chamber is of double wall formation having an inner wall 17 and an outer wall 18. The two walls 17 and 18 are formed of sheet metal, the wall 17 being bent around the ledge 11 and into the undercut annular pocket 12 with the edge thereof forced into the annular groove 13. The sheet metal wall 17 is mounted on the ring 10 under die pressure or the like and in view of the interlocking engagement between the wall 17 and ring 10 occasioned by the grooved portions of the ring, the wall and ring are rigidly retained in assembled formation against relative movement. The sheet metal wall 17 presents an inclined face intermediate the undercut pocket 12 and groove 13 as indicated by the numeral 19 that mates with the inclined face 4 upon the lower section of the cooking chamber. With the two rings assembled as shown in Figures 1 and 6, an annular space exists between the ledge 11 and upper end 5 of the ring 1. The wedging action between the cooperating lugs 7 and 14 causes a binding action between the inclined faces 4 and 19 and provides a sheet metal contact or joint that is leak proof against the escape of steam. With a sheet metal joint of this character, as contrasted with cast aluminum or other metal cookers, all machining of the contact faces is eliminated, the binding action of the wedging lugs affecting a steam tight joint between the contacting sheet metal faces and greatly reducing the cost of manufacture.

The upper section of the cooking chamber is of dome-shape, the lower edge of the outer wall 18 resting upon the annular ledge 20 at the outer side of the ring 10 while a plug 21 is set into an opening in the center of the top of the upper section. A filling 22 of asbestos or the like is placed between the spaced walls 17 and 18 to confine heat within the cooking chamber. The plug 21 carries an annular clamping flange 23 at its lower end that engages the inner face of the inner wall 17 and the clamping nut 24 threaded on the plug has an annular flange 25 at its upper end that engages the outer wall 18, the two walls 17 and 18 being clamped between the flanges 23 and 25 of the plug 21 and clamping nut 24. An axial bore 26 formed in the plug 21 and opening to the interior of the cooking chamber communicates with the atmosphere through the side ports 27, the bore being normally closed by the spring valve 28 that constitutes a safety blow-off valve. A thermometer tube 29 is set into a longitudinal groove in the side wall of the plug 21 for determining cooking temperatures while a laterally projecting nipple 30 carried by the plug 21 and communicating with the bore 26 is provided for purposes presently to appear.

The base section of the cooker upon which the two part cooking chamber is removably mounted, as shown in Figure 1, is formed of sheet metal having an annular side wall 31, a bottom wall 32 set upwardly from the lower edge of the side wall, while the upper edge of the annular side wall 31 is bent inwardly at right angles as at 33 to provide a horizontal shelf and then downwardly as at 34 for a relatively short distance, the base section receiving a filler 22 similar to the upper cooking chamber. While it is intended that any character of heating medium desired may be associated with the base section of the cooker, the same is herein illustrated as electrically heated. A concave porcelain disk 35 as shown in Figures 1 and 5 with a spiral groove in its upper concave face for the electric resistance element is set into the base section and the support therefor comprises a pair of ring members 36 and 37. The ring member 36 is supported by the ring member 37 while the porcelain disk 35 supported at its peripheral edge by the ring member 37 is set into the ring member 36. When so disposed, the upper edge of the ring member 36 is engaged with the lower edge of the inner wall 34 of the base section and to provide for the rigid supporting of the disk 35 and binding engagement between the ring member 36 and the wall 34 of the base section, there is provided a plurality of cam lugs 38 shown in detail in Figure 14 that are moved into engagement with the underside of the ring member 37 to move the same upwardly in a manner as will at once be obvious from an inspection of Figures 1 and 4.

The source of electrical energy associated with the spirally grooved disk 35 for heating the cooker is diagrammatically illustrated in Figure 7, there being a pair of lead-in wires $a$ and $b$ having fuse inserts $c$, the wire $d$ from wire $a$ leading to manual switches $e$ and $f$, while the wire $g$ from the wire $b$ leads to an automatic switch $h$. The switch $e$ has a wire connection $i$ with the section of resistance $j$ that is set into the spiral groove of the concaved disk 35, the wire $k$ from the section of resistance $j$ leading to the automatic switch $h$ by the wire $m$. The resistance section $j$ is in series with the two resistance sections $n$ and $o$ while the wire $p$ from the switch $f$ leads to the resistance sections $n$ and $o$. The wire $r$ from the resistance section $o$ returns to the wire $m$ and automatic switch $h$. Each of the resistance sections $j$, $n$ and $o$ carries a capacity of 600 watts and with this arrangement of switches it is possible to employ a capacity of either 600, 1200, or 1800 watts. When using 600 watts, the switch $f$ is opened and the switch $e$ is closed, the current flowing through the resistance $j$ and returning to the lead in wire $b$ by way of the wires $k$, $m$, automatic switch $h$ and wire $g$. When it is desired to employ a resistance capacity of 1200 watts, the switch $e$ is manually opened and the switch $f$ closed, the current flowing from the switch $f$ through the wire $p$ to resistance sections $n$ and $o$ and returning over wires $k$ and $r$ to wire $m$, automatic switch $h$ and wire $g$. When employing the full resistance capacity of 1800 watts, both manual switches $e$ and $f$ are closed. The switch $h$ that is automatic in its operation and diagrammatically illustrated in Figure 7 as a preferred form thereof illustrated in Figures 1, 8 and 9 with temperature and pressure operating devices associated therewith for operating the same.

The switch h is set into a compartment in the base section of the cooker that is formed by the sheet metal wall 39, a pair of spaced knife switch contacts 40 being carried by the insulation block 41 that is mounted on bracket 41ª and to which the circuit wires g and m are connected. The rod 42 is journaled in the side wall 31 of the base section and has a squared portion 43 that rotatably and slidably extends through the side wall of the housing 39. The squared end 43 of the rod 42 extends through a square bore in the externally threaded sleeve 44 that has threaded engagement with the ring 45 that is fixed to insulation sleeve 46, the upper side of the sleeve carrying an arm 47 that extends into the slot 48 in the top wall of the housing 39 to prevent rotation thereof while the lower end of said sleeve 46 carries a double switch blade 49 having the separate switch blades 50 respectively engaged with the switch blade contacts 40. A finger 51 projects from one end of the insulation sleeve 46 to be engaged by a steam pressure operated device for automatically opening the switch at predetermined temperatures in the cooking chamber. The outer end of the rotatable rod 42 as shown in Figure 13 carries an operating head 52 and an indicator finger 53 moving over the dial 54 on the outer side of the base section so that the switch blades 50 may be primarily set with respect to the switch blade contacts 40 to affect automatic opening of the switch at predetermined temperatures.

An automatically operating valve is associated with the cooker to permit the escape of all air from the cooking chamber that operates in the presence of steam to cut off communication between the interior of the cooking chamber and the atmosphere and also for effecting opening movement of the automatic switch at predetermined temperatures, the valve comprising, as shown in Figure 1, a body 55 set into the side wall 31 of the base section in proximity of the automatic switch, the valve body 55 having an axial bore 56 therein. The inner end of the valve body 55 carries a bellows diaphragm 57 in proximity of the finger 51 upon the insulation sleeve 46 while the outer end of the valve body carries a nipple 58. A steam hose 59 extends between the nipple 58 on the valve body 55 and the nipple 30 upon the head plug 21. A depression or cavity 60 is formed in the valve body 25 outwardly of the side wall 31 of the base section while a vent opening 61 is formed in the upper side of the valve body above the cavity, a ball valve 62 of the portable type being received in the cavity 60 to operate in a manner to be now described.

With the two sections of the cooker assembled as shown in Figure 1, the inner edge of the leg 33 upon the base section forms a sheet for the annular groove 6 in the ring 1 with the bowl-shaped sheet metal pan 2 of the lower section of the cooking chamber disposed in proximity to the electric resistance element. The automatic switch being normally closed and it being desired to cook at low temperature utilizing resistance of 600 watts capacity, the switch e is manually closed and the current flows through the resistance section j. The two sections of the cooking chamber are assembled in a manner as previously described by the use of the tool 63 that is extended through one of the openings 64 in the ring 10 engage one of the side walls 8 of the lugs and a wall of the opening to bring the abutting inclined faces 9 and 16 into wedging engagement. It being understood that the two sections of the cooking chamber are disassembled by the reverse use of the tool 63 in placing the same in the other opening 64. The air in the cooking chamber escapes through the bore 26 in the plug 21 and flows through the steam hose 59 into the valve body 55 to escape through the vent 61. Upon the generation of steam within the cooking chamber, there is an initial escape in a like manner and also the collection of condensation in the cavity 60 for floating the ball valve 62 to close the vent 61, the cooking chamber at this time being entirely freed of all air so that the cooking operation is accomplished only in the presence of steam. The safety valve 28 in the plug 21 operates in the presence of excessive steam pressure to vent through the port 27 while the temperature in the cooking chamber is indicated by the thermometer 29. Should a higher temperature occur in the cooking chamber than for which the cooking operation is intended by the indicator finger 53, there will be a corresponding increase in steam pressure within the cooking chamber that is also present in the valve body 55 for operating the bellows diaphragm 57, and upon expansion of said diaphragm, the finger 51 carried by the insulation sleeve 46 which in turn carries the switch blades, is shifted with the externally threaded sleeve 44 upon the squared portion 43 of the rod 42 for displacing the knife blades 50 from engagement with the knife blade contacts 40 thereby breaking the circuit and cutting off the source of energy. It will be observed that the valve 55 permits the exhausting of all air from the cooking chamber and also operates to work the automatic switch h. The valve 55 operates in a like manner when other sections of the resistance are in use while the ringer 51 may be adjusted with respect to the diaphragm bellows 57 to cause automatic operation of the switch h at the desired temperature.

Cooking in separate vessels 65 in the cooking chamber is accomplished by the provision of the pan racks as shown in Figures 1 and 10, one of the racks being supported upon the upper end 5 of the ring 1 and comprising a corrugated wire ring 66 having the corrugations thereof alternately bent in opposite directions as shown in Figure 6 with the outwardly bent corrugations of the ring having a circular band 67 soldered or otherwise secured thereto, the outer corrugations of the ring 66 resting upon the upper end 5 of the ring 1 as shown in Figure 6 while the band 67 engages the inner upper side of said ring. The pan 65 is set into the inwardly bent corrugations of the ring 66. The rack for supporting the upper pan 65 that in turn is supported upon the upper end of the lower pan 65 is shown in detail in Figure 10, the corrugated ring 68 having the band 69 secured to the inner side thereof, the ring 68 resting upon the upper edge of the lower pan 65 while the upper pan 65 is supported within the corrugated ring 68 and also upon the band 69.

Another form of valve to be substituted for the valve 55 is shown in Figure 12, wherein another type of automatic electric switch is also illustrated, there being shown a stop switch 70 secured to the side wall 31 of the base section with the switch lever 71 projecting outwardly of the base section. The cylinder 72 that houses a freely movable ball valve 73 has a removable screw plug 74 therein that is pivotally attached as at 75 to the outer end of the switch lever 71 while the upper end of the cylinder 72 has the removable plug 74 in its lower end that is pivotally attached as at 75 to the switch lever 71. The upper end of the cylinder 72 is enlarged as at 76 and has a piston 77 reciprocating therein, the piston 77 carrying a tubular piston rod 78 that extended downwardly through the enlarged bore 79 into the cylinder 72. The piston rod 78 being tubular is open at its lower end for cooperation with the ball valve 73 while the upper end thereof is closed, the tubular piston rod 78 being provided with a side vent 79. The bracket arm 80 carried by the side wall 31 of the base section is provided with a pin 81 that extends into the slot 82 extending through the upper end of the tubular piston 78 for limiting movements thereof. The switch lever 71 being spring pressed in opposite directions is of a strength sufficient to support the cylinder 72. In the operation of this valve mechanism, the air is exhausted from the cooking chamber to the pipe 59 and enters the cylinder 72 to escape upwardly through the tubular piston rod 78 and side vent 79. The subsequent escape of steam provides condensation in the cylinder 72 and a floating of the ball valve 73 to close the lower end of the tubular piston rod, the steam then passing through the enlarged bore 79 to engage the upper face of the piston 77 in the upper enlarged end 76 of the cylinder 72 to move the piston 77 upwardly a distance that is limited by the pin and slot 81—82 with the subsequent lowering movement of the cylinder 72 for operating the switch lever 71.

From the above detailed description of the invention, it is believed that the construction and operation thereof will at once be apparent, it being noted that there is provided a steam-tight sheet metal joint between the upper and lower sections of the cooking chamber, the peculiar interlocking connection between the two rings 1 and 10 of the two parts of the cooking chamber provides for an intimate binding and steam tight joint between the abutting sheet metal faces of the two sections. The operation of either of the valves 55 or 72 will also be apparent, it being noted that in each instance, all air is first exhausted from the cooking chamber and that subsequent condensation of steam in the valve effects closing thereof to the atmosphere and confining of the steam. The operation of each automatic electric switch will also be apparent, the switch shown in Figure 1 being operated by the bellows diaphragm 57 while the pressure operated valve cylinder 72 operates the snap switch 70 shown in Figure 12.

While there are herein shown and described the preferred embodiments of the present invention, it is nevertheless to be understood that minor changes may be made therein without departing from the spirit and scope of the invention.

What I claim as new is:—

1. In a steam cooker of the character described, a heater base section and an upper cooking chamber formed of two sections, the two sections of the cooking chamber being formed of sheet metal, a ring carried by each section of the cooking chamber and a wedging interlocking connection between the rings of the cooking chamber to cause binding engagement of the sheet metal joint.

2. In a steam cooker of the character described, a cooking chamber constructed of sheet metal, formed of two sections and defining a sheet metal joint, a ring carried by the meeting edge of each section and concentrically arranged when the sections are assembled and a plurality of wedge lugs carried by the ring with the lugs of one ring engaged with the lugs of the other ring in superposed relation to effect a steam-tight joint between the two sections.

3. In a steam cooker, a cooking chamber and a valve associated therewith and operating to permit the exhaust to atmosphere of air within the cooking chamber and cutting off communication between the cooking chamber and atmosphere upon the presence of steam condensation therein.

4. In a steam cooker of the character described, a cooking chamber formed of mating interlocking sections, a valve in communication with the cooking chamber, said valve having a vent to permit the escape of air from the cooking chamber, and a float to close the vent upon the presence of steam condensation in the valve.

5. In a steam cooker of the character described, a cooking chamber formed of mating interlocking sections, a valve in communication with the cooking chamber, said valve having a vent, a steam condensation settling cavity and a float valve in the cavity, whereby condensed steam in the cavity floats the valve to close the vent after the air has been expelled.

6. In a steam cooker of the character described, a cooking chamber, a heating base section, and pan racks for the cooking chamber comprising a ring carrying a corrugated wire band having adjacent corrugations bent in opposite directions for the support of the rack and a pan.

7. In a steam cooker, a heater base section and an upper cooking chamber formed of two sections, the two sections of the cooking chamber being formed of sheet metal, a cast ring at the meeting edge of each cooking chamber section with the sheet metal edge rolled therein, said rings telescoping when the cooking chamber sections are assembled, and interfitting lugs on the rings having opposed screw thread faces for causing binding engagement of the sheet metal joint.

8. In a steam cooker, a heater base section and an upper cooking chamber formed of two sections, the two sections of the cooking chamber being formed of sheet metal, a cast ring at the meeting edge of each cooking chamber section with the sheet metal edge rolled therein, said rings telescoping when the cooking chamber sections are assembled, and interfitting lugs on the rings having opposed screw thread faces for causing binding engagement of the sheet metal joint, the contacting faces of the sheet metal joint being at an angle to the line of contacting faces of the rings to increase frictional contact when the rings are assembled.

9. In a two-section sheet metal cooker, two sheet metal cooker sections, each of receptacle-like formation and a clamping ring on the meeting edge of each section to present the sheet metal of the two sections in telescoping relations for effecting a steam tight joint when the clamping rings are engaged with each other below the sheet metal contacting points.

In testimony whereof I affix my signature.

CHARLES L. GOUGHNOUR.